(12) United States Patent
Gala et al.

(10) Patent No.: US 12,056,187 B2
(45) Date of Patent: *Aug. 6, 2024

(54) EXISTENCE CHECKS ON ROWS WITHIN A DATABASE

(71) Applicant: SAP SE, Walldorf (DE)

(72) Inventors: Dheren Gala, Pune (IN); Aditya Gurajada, San Ramon, CA (US)

(73) Assignee: SAP SE, Walldorf (DE)

( * ) Notice: Subject to any disclaimer, the term of this patent is extended or adjusted under 35 U.S.C. 154(b) by 174 days.

This patent is subject to a terminal disclaimer.

(21) Appl. No.: 17/669,710

(22) Filed: Feb. 11, 2022

(65) Prior Publication Data

US 2022/0164385 A1 May 26, 2022

Related U.S. Application Data

(63) Continuation of application No. 16/399,523, filed on Apr. 30, 2019, now Pat. No. 11,281,719.

(51) Int. Cl.
*G06F 16/901* (2019.01)
*G06F 11/14* (2006.01)
*G06F 16/22* (2019.01)
*G06F 16/23* (2019.01)
*G06F 16/2455* (2019.01)

(52) U.S. Cl.
CPC ........ *G06F 16/901* (2019.01); *G06F 11/1471* (2013.01); *G06F 16/2237* (2019.01); *G06F 16/2255* (2019.01); *G06F 16/2358* (2019.01); *G06F 16/2365* (2019.01); *G06F 16/24552* (2019.01); *G06F 2201/80* (2013.01)

(58) Field of Classification Search
CPC ............. G06F 16/2379; G06F 11/2023; G06F 16/2282; G06F 16/2365; G06F 16/24552; G06F 16/278; G06F 16/2255; G06F 16/2237; G06F 16/2358; G06F 16/901; G06F 16/22

See application file for complete search history.

(56) References Cited

U.S. PATENT DOCUMENTS

| 10,496,621 | B2 | 12/2019 | Oks et al. | |
|---|---|---|---|---|
| 2012/0166400 | A1* | 6/2012 | Sinclair | G06F 16/23 707/E17.005 |
| 2014/0129530 | A1* | 5/2014 | Raufman | G06F 16/901 707/693 |
| 2017/0316002 | A1* | 11/2017 | Mittal | G06F 16/24552 |

(Continued)

OTHER PUBLICATIONS

"U.S. Appl. No. 16/399,523, Notice of Allowance mailed Nov. 12, 2021", 14 pgs.

*Primary Examiner* — Marcin R Filipczyk
(74) *Attorney, Agent, or Firm* — SCHWEGMAN LUNDBERG & WOESSNER, P.A.

(57) ABSTRACT

Example methods and systems are directed to existence checks on rows within a database. A page data structure stores bitmap data for the rows in the page. A row within the page corresponds to a single bit in the bitmap data. To determine if a row has been deleted, the page data structure for the page containing the row is located and the bit for the row in the page data structure is checked. An array of page data structures is created, indexed by a hash of the page identifier. In the event of a hash collision, a linked list of page data structures is used, sorted by page identifier.

20 Claims, 7 Drawing Sheets

(56) References Cited

U.S. PATENT DOCUMENTS

2018/0011892 A1* 1/2018 Kimura ............... G06F 16/2365
2020/0272603 A1 8/2020 Matters et al.
2020/0349193 A1 11/2020 Gala et al.

* cited by examiner

EXISTENCE CHECKS ON ROWS WITHIN A DATABASE

CROSS-REFERENCE TO RELATED APPLICATIONS

This application is a continuation of prior application Ser. No. 16/399,523, filed on Apr. 30, 2019, which is incorporated by reference herein in its entirety.

TECHNICAL FIELD

The subject matter disclosed herein generally relates to databases. Specifically, the present disclosure addresses systems and methods to perform existence checks on rows within a database using an efficient data structure.

BACKGROUND

An in-memory database generates a log of transactions to allow reconstruction of the state of the database in the event that the database is shut down. To reduce the amount of computation and time consumed to reconstruct the in-memory database, the log is scanned backwards and the rows of the database that were deleted at the time of shutdown are identified first and transactions that create or modify the deleted rows are ignored instead of being performed.

Each row has a unique row identifier. The row identifier of each deleted row is hashed and the hash is used as an index into an array of deleted row data structures. When few rows are deleted, there are few hash collisions, and both insertion of new rows in the array and lookups to determine if a row has been deleted are fast. When many rows are deleted, there are many hash collisions. To resolve hash collisions, an overflow data structure is used, wherein a data structure in the array is the head of a linked list and additional elements of the list are allocated as needed. Insertion is relatively fast, as new items can simply be appended to the end of the linked list as needed. However, lookup is slow, since the row identifier of interest must be compared with the row identifier of every deleted row with the same hash.

BRIEF DESCRIPTION OF THE DRAWINGS

Some embodiments are illustrated by way of example and not limitation in the figures of the accompanying drawings.

DETAILED DESCRIPTION

Example methods and systems are directed to existence checks on rows within a database. A page data structure stores bitmap data for the rows in the page. A row within the page corresponds to a single bit in the bitmap data. To determine if a row has been deleted, the page data structure for the page containing the row is located and the bit for the row in the page data structure is checked.

An array of page data structures is created, indexed by a hash of the page identifier. Since there are fewer pages than there are rows, using page data structures instead of row data structures in the array reduces the chances of a hash collision. In the event of a hash collision, a linked list of page data structures is used, sorted by page identifier. By comparison to a prior art row-based design, the linked list of page data structures will be smaller, resulting in fewer memory accesses to traverse the list and reducing both insertion and lookup time.

Figure 1:
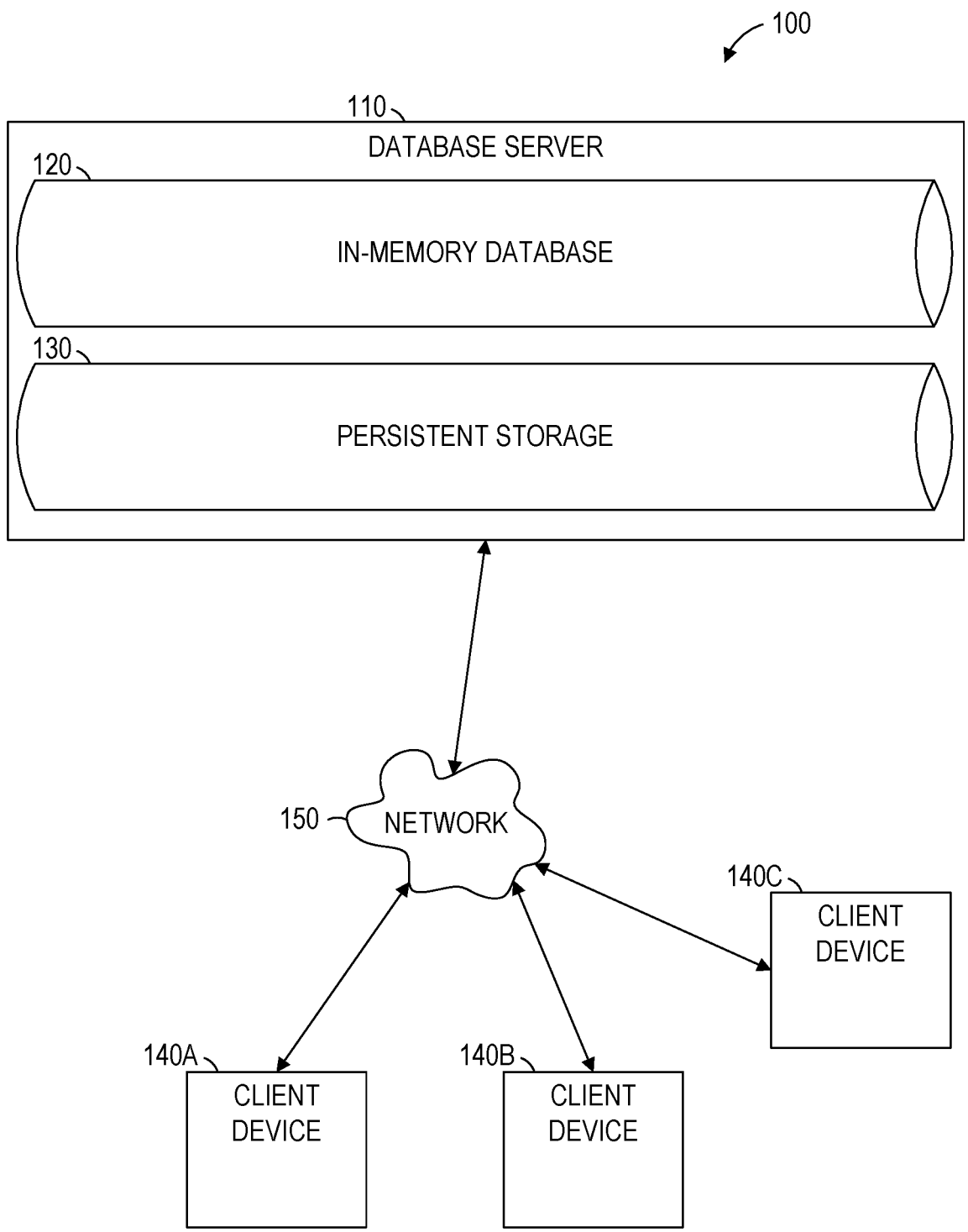
FIG. 1 is a network diagram illustrating a network environment suitable for performance of existence checks on rows within a database, according to some example embodiments.

FIG. 1 is a network diagram illustrating a network environment 100 suitable for performance of existence checks on rows within a database, according to some example embodiments. The network environment 100 includes a database server 110, client devices 140A, 140B, and 140C, and a network 150. The database server 110 provides access to an in-memory database 120 and stores logs of database transactions in persistent storage 130. The database server 110 and the client devices 140A, 140B, and 140C may each be implemented in a computer system, in whole or in part, as described below with respect to FIG. 7. The client devices 140A, 140B, and 140C may be referred to collectively as client devices 140 or generically as a client device 140.

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIG. 7. As used herein, a "database" is a data storage resource and may store data structured as a text file, a table, a spreadsheet, a relational database (e.g., an object-relational database), a triple store, a hierarchical data store, a document-oriented NoSQL database, a file store, or any suitable combination thereof. The database may be an in-memory database. Moreover, any two or more of the machines, databases, or devices illustrated in FIG. 1 may be combined into a single machine, database, or device, and the functions described herein for any single machine, database, or device may be subdivided among multiple machines, databases, or devices.

The database server 110 and the client devices 140A-140C are connected by the network 150. The network 150 may be any network that enables communication between or among machines, databases, and devices. Accordingly, the network 150 may be a wired network, a wireless network (e.g., a mobile or cellular network), or any suitable combination thereof. The network 150 may include one or more portions that constitute a private network, a public network (e.g., the Internet), or any suitable combination thereof. The persistent storage 130 may be implemented as a solid-state drive (SSD), a hard drive, a network storage device, a redundant array of inexpensive disks (RAID), cloud storage, or any other storage device suitable for storing layers of a union file system.

Figure 2:
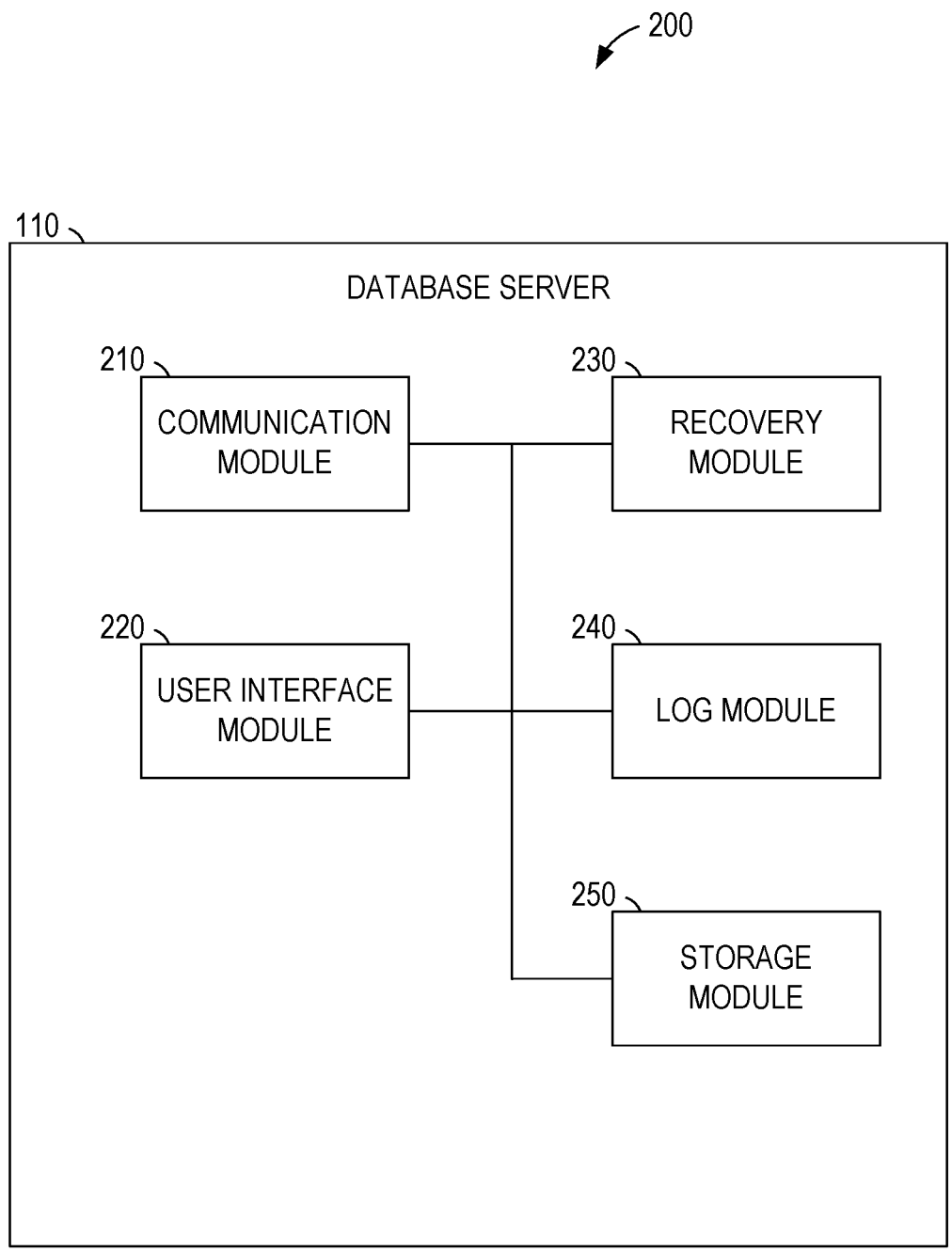
FIG. 2 is a block diagram of a database server, according to some example embodiments, suitable for performing existence checks on rows within a database.

FIG. 2 is a block diagram 200 of the database server 110, according to some example embodiments, suitable for performing existence checks on rows within a database. The database server 110 is shown as including a communication module 210, a user interface module 220, a recovery module 230, a log module 240, and a storage module 250, all configured to communicate with each other (e.g., via a bus, shared memory, or a switch). Any one or more of the modules described herein may be implemented using hardware (e.g., a processor of a machine). For example, any module described herein may be implemented by a processor configured to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The communication module 210 receives data sent to the database server 110 and transmits data from the database server 110. For example, the communication module 210 may receive, from the client device 140A, a request for access to data from the in-memory database 120. The communication module 210 provides the request to the storage module 250. The storage module 250 accesses the requested data from the in-memory database 120 and provides the data to the communication module 210 for provision to the client device 140A. If the request comprises a modification to the database, the log module 240 logs the change to the persistent storage 130. Communications sent and received by the communication module 210 may be intermediated by the network 150.

The user interface module 220 causes presentation of a user interface for the database server 110 on a display associated with the client device 140A, 140B, or 140C. The user interface allows a user to view data stored in the in-memory database 120, to modify data stored in the in-memory database 120, to add data to the in-memory database 120, or any suitable combination thereof.

The recovery module 230 accesses the logs created by the log module 240 to restore the state of the in-memory database 120 after a shutdown. The methods and data structures described herein are used by the recovery module 230 to perform existence checks on rows within the database efficiently.

Figure 3:
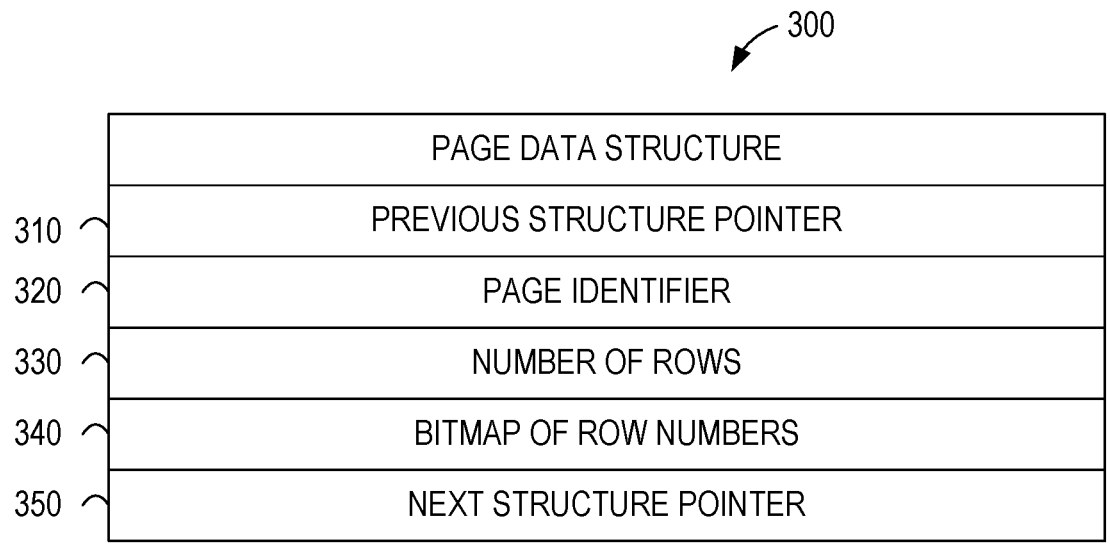
FIG. 3 is a block diagram of a page data structure for use in performing existence checks on rows within a database, according to some example embodiments.

FIG. 3 is a block diagram of a page data structure 300 for use in performing existence checks on rows within a database, according to some example embodiments. The page data structure 300 includes a previous structure pointer 310, a page identifier 320, a number of rows 330, a bitmap of row identifiers 340, and a next structure pointer 350. The previous structure pointer 310 and the next structure pointer 350 allow the page data structure 300 to be used in a doubly-linked list. The page identifier 320 contains an identifier of the page for which the page data structure 300 contains data. The number of rows 330 indicates the number of deleted rows in the page. The bitmap of row identifiers 340 includes a set of bits, one bit corresponding to each row in the page. The bit is set to one value (e.g., 1) to indicate that the row has been deleted and to another value (e.g., 0) to indicate that the row has not been deleted. In some example embodiments, the bitmap of row identifiers 340 comprises 256 bytes (4096 bits) and each page is limited to 4096 rows.

Figure 4:
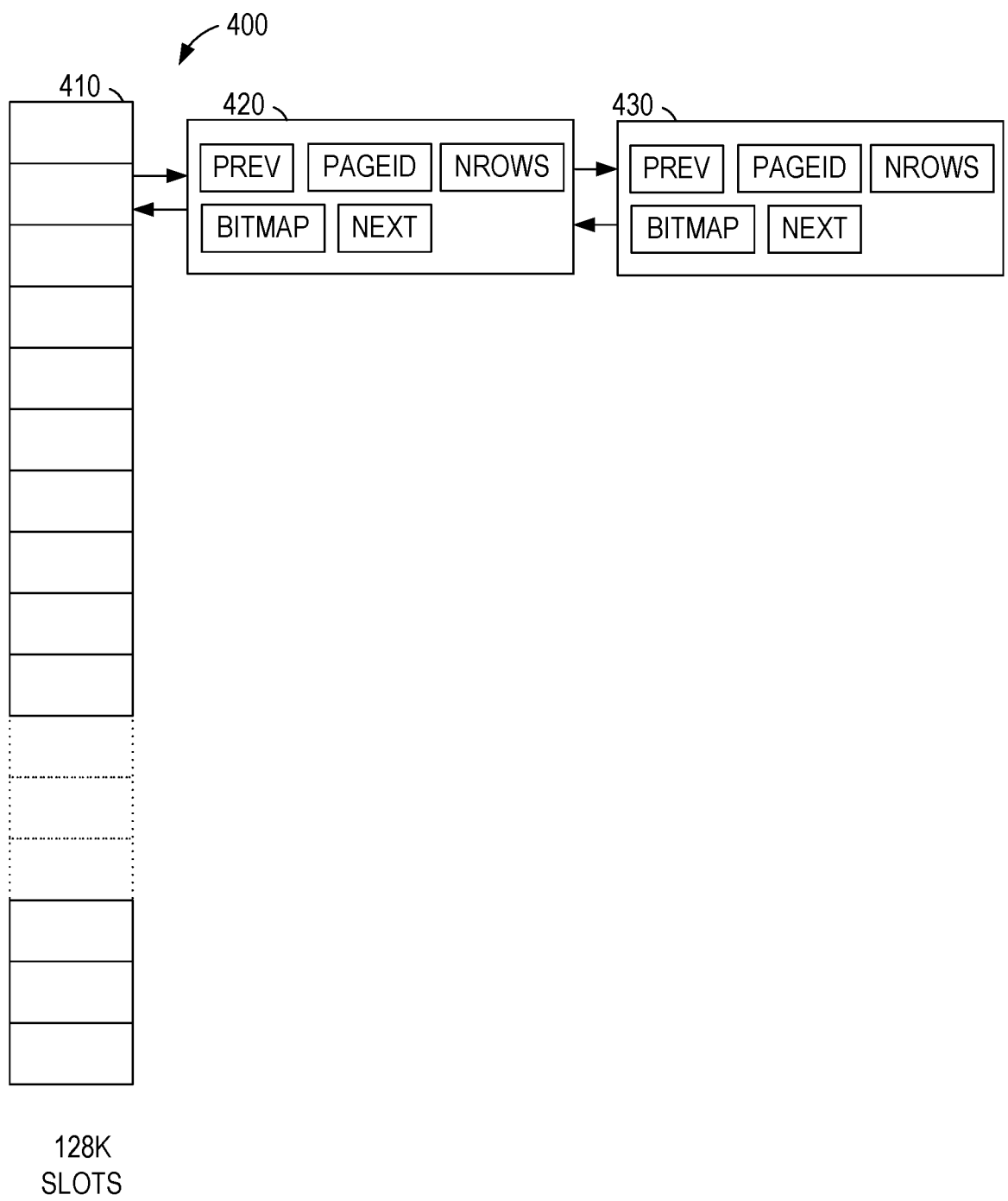
FIG. 4 is a block diagram of an array of page data structures for use in performing existence checks on rows within a database, according to some example embodiments.

FIG. 4 is a block diagram 400 of an array 410 of page data structures 300 for use in performing existence checks on rows within a database, according to some example embodiments. The array 410 comprises 128k (131,072) slots. Each slot is indexed by a hash of a page identifier. When data for a first row of a first page with a first page identifier is added to the array 410, the slot of the hash of the first page identifier is initially empty. The slot is filled with a page data structure 300 for the first page. When data for a second row of a second page is added to the array 410, there may be a collision between the hash of the first page identifier and the hash of the second page identifier of the second page. If there is a collision, a second page data structure 420 is created for the second page. The next pointer of the first page data structure is set to point to the second page data structure 420 and the previous pointer of the second page data structure 420 is set to point to the first page data structure, forming a doubly-linked list.

With each additional hash collision, an additional page data structure is allocated and added to the doubly-linked list (e.g., the page data structure 430 is added). In some example embodiments, the doubly-linked list is sorted based on the page identifier of each page. Using a sorted list, a lookup can stop as soon as a higher page identifier is reached, reducing the lookup time as compared to implementations using unsorted lists.

In some example embodiments, a pool of unused page data structures is allocated before the page data structures are needed. As a result, a single memory allocation operation may be performed to allocate space for multiple data structures, saving time over repeated individual allocations since an allocation takes the same amount of time and processing cycles regardless of the size of memory allocated. Additionally, since there is some system overhead in tracking each allocation, space is saved by allocating multiple data structures at once. When a new page data structure is needed, it is accessed from the pool of unused page data structures instead of performing an allocation at that time.

Figure 5:
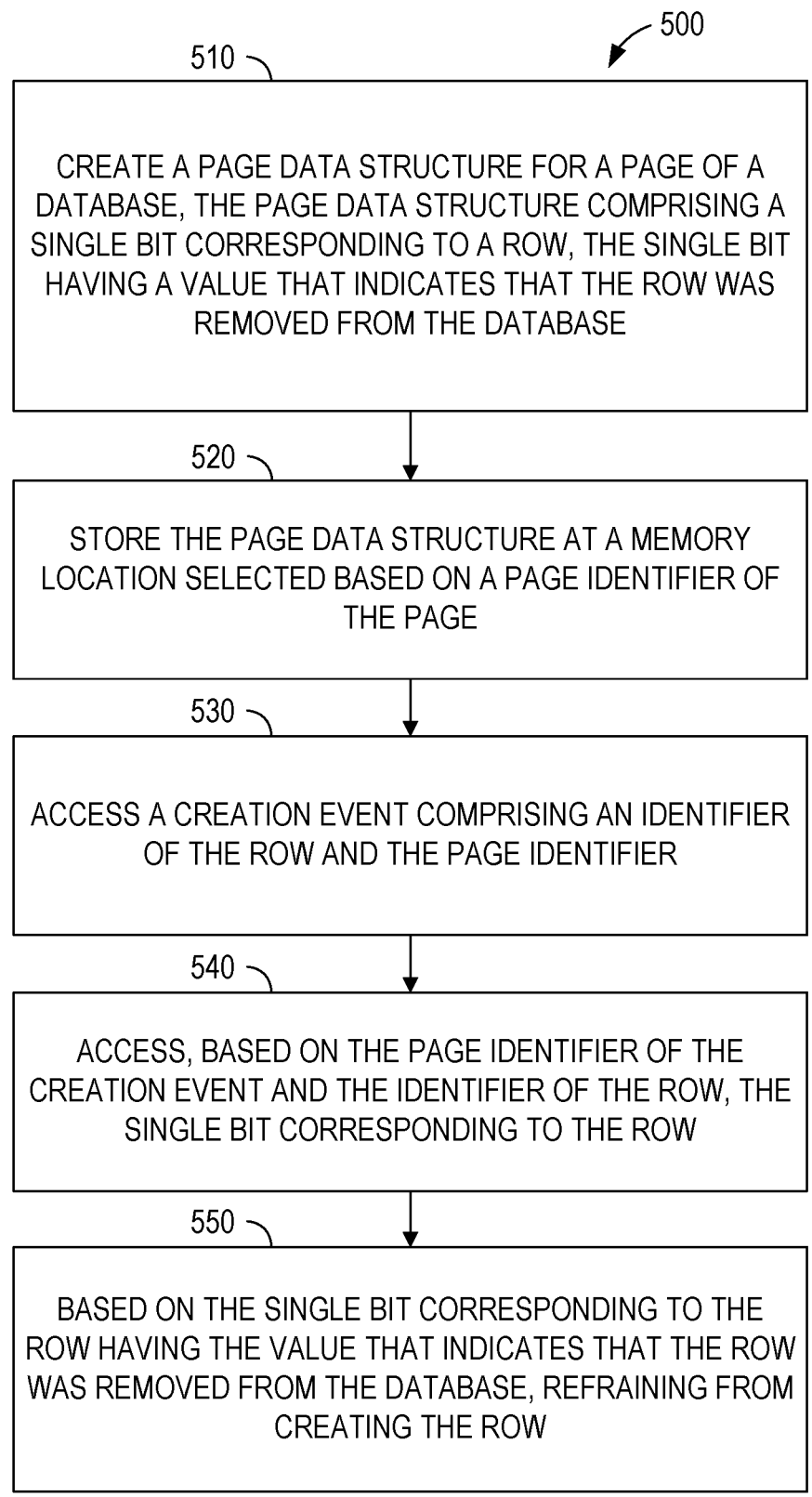
FIG. 5 is a flowchart illustrating operations of a method suitable for performing existence checks on rows within a database, according to some example embodiments.

FIG. 5 is a flowchart illustrating operations of a method 500 suitable for performing existence checks on rows within a database, according to some example embodiments. The method 500 includes operations 510, 520, 530, 540, and 550. By way of example and not limitation, the method 500 is described as being performed by the systems and databases of FIGS. 1-2 using the data structures of FIGS. 3-4.

In operation 510, the recovery module 230 of the database server 110 creates a page data structure (e.g., an instance of the page data structure 300) for a page of the database 120. The data structure comprises a single bit corresponding to a row and the single bit has a value that indicates that the row was removed from the database. As an example, the recovery module 230 accesses a log stored in the persistent storage 130. The log contains a set of entries, with each entry identifying a row that was deleted. The entry includes a page identifier of the page containing the row and a row identifier of the row within the page. For each entry identifying a new page, operation 510 is performed to create a page data structure for the page. For each entry identifying a previously-identified page, the already-created page data structure is updated so that the single bit of the page data structure corresponding to the row of the entry is modified to indicate that the row was removed from the database.

The recovery module 230, in operation 520, stores the page data structure at a memory location selected based on a page identifier of the page. As an example, an array of page data structures is created such that the index for a page is a hash of the page identifier for the page. In some example embodiments, a 17-bit hash value is used and the array includes 128 k (131,072) elements.

A creation event comprising an identifier of the row and the page identifier is accessed by the recovery module 230 in operation 530. As an example, the recovery module 230 accesses a creation log stored in the persistent storage 130. The creation log contains a set of entries, with each entry identifying a row that was created. The entry includes a page identifier of the page containing the row and a row identifier of the row within the page.

In operation 540, the recovery module 230 accesses, based on the page identifier of the creation event and the identifier of the row, the single bit corresponding to the row. As an example, the page identifier of the creation event is hashed and the hash is used to access the page data structure in an array of page data structures. Within the page data structure, the row identifier is used to select the single bit corresponding to the row. In some example embodiments, the row identifier is used to define a mask that is bitwise-ANDed with the bitmap 340. If the result of the AND is zero, the single bit for the row was not set and the row was not deleted; if the result of the AND is non-zero, the single bit for the row was set and the row was deleted.

The recovery module 230, in operation 550, based on the single bit corresponding to the row having the value that indicates that the row was removed from the database, refrains from creating the row. If the page data structure was not found for the creation event, thus preventing operation 540 from being performed, or if the single bit corresponding to the row did not have the value that indicates that the row was removed from the database, the row identified in the creation event is created in the in-memory database 120.

Figure 6:
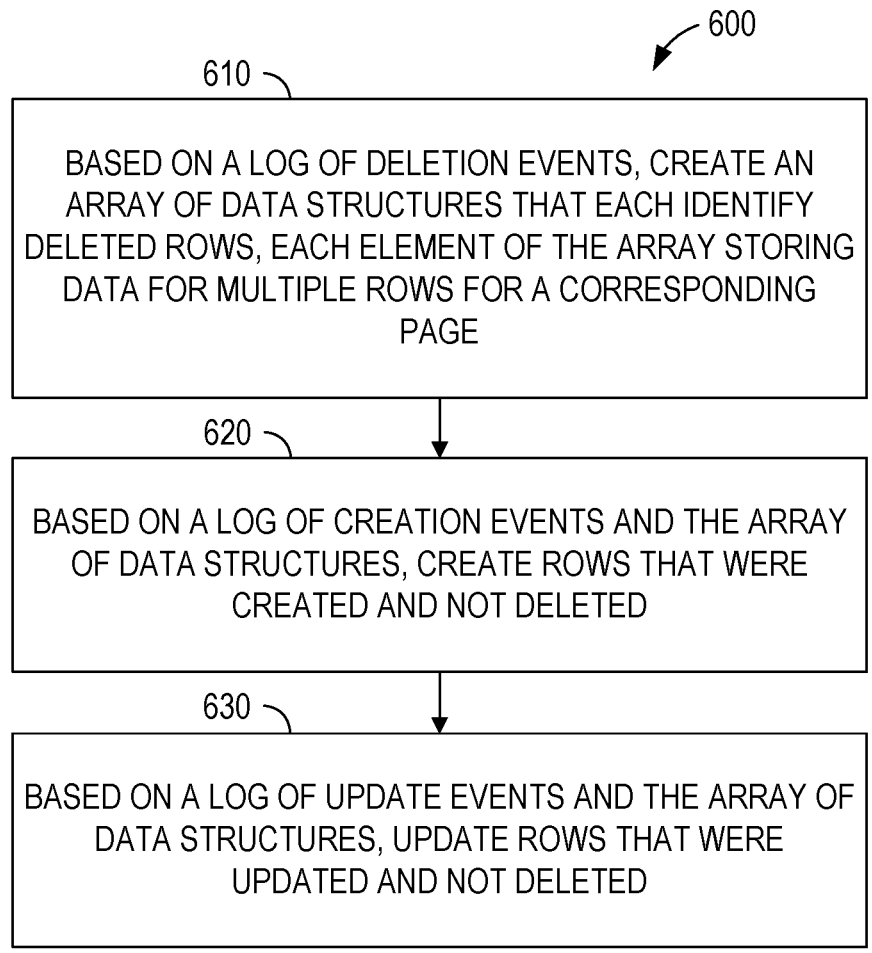
FIG. 6 is a flowchart illustrating operations of a method suitable for performing existence checks on rows within a database, according to some example embodiments.

FIG. 6 is a flowchart illustrating operations of a method 600 suitable for performing existence checks on rows within a database, according to some example embodiments. The method 600 includes operations 610, 620, and 630 and may be performed as part of a database recovery. For example, after an unexpected shutdown of the database server 110 of FIG. 1, the method 600 may be performed to recover the state of the in-memory database 120 based on logs stored in the persistent storage 130. By way of example and not limitation, the method 600 is described as being performed by the systems and databases of FIGS. 1-2 using the data structure of FIG. 3.

In operation 610, the recovery module 230, based on a log of deletion events, creates an array of data structures that each identify deleted rows, each element of the array storing data for multiple rows for a corresponding page. As an example, an array of the data structures 300 is created and the bitmap 340 of each data structure is updated to indicate the deleted rows identified in the log of deletion events.

The recovery module 230, in operation 620, based on a log of creation events and the array of data structures, creates rows that were created and not deleted. As an example, the log of creation events comprises a set of creation events. Thus, the accessing of the creation event in the operation 530 of the method 500 may be implemented as part of the operation 620 in which the set of creation events is accessed from the log of creation events. For each creation event comprising a page identifier and a row identifier, the array of data structures is accessed to determine if the bit for the identified row of the identified page was set to the value that indicates that the row was deleted. If the row was not deleted, the row is created in the in-memory database 120 in accordance with the creation event.

Based on a log of update events and the array of data structures, the recovery module 230 updates rows that were updated and not deleted (operation 630). In some example embodiments, the array of data structures is checked, as in operation 620, to determine if the update operation should proceed. In other example embodiments, the in-memory database 120 is checked and the update operation proceeds only if the row was already created in operation 620.

Thus, by use of the method 600, the in-memory database 120 is recovered from a set of logs without wasting efforts in creating and updating rows that are ultimately removed from the database. Further, by use of the data structure 300, the efficiency of the operations of creating the array of data structures and looking up rows in the array of data structures are improved. Thus, a database server 110 implementing the method 600 consumes fewer processor cycles in restoring a database than servers using prior art methods. This reduces the downtime of the database server 110 after a shutdown event, increasing the uptime percentage of the database server 110.

EXAMPLES

Example 1. A method comprising:
creating, by one or more processors, a page data structure for a page of a database, the page comprising a row, the page data structure comprising a single bit corresponding to the row, the single bit having a value that indicates that the row was removed from the database;
storing the page data structure at a memory location selected based on a page identifier of the page;
accessing a creation event comprising an identifier of the row and the page identifier;
accessing, based on the page identifier of the creation event and the identifier of the row, the single bit corresponding to the row; and
based on the single bit corresponding to the row having the value that indicates that the row was removed from the database, refraining from creating the row.

Example 2. The method of example 1, wherein:
the creation event is one of a set of creation events and the accessing of the creation event is part of accessing the set of creation events;
the set of creation events further comprise a second creation event comprising a second identifier of a second row and a second page identifier of a second page; and
the method further comprises:
based on a determination that a memory location identified based on the second page identifier of the creation event does not store data for the second page, creating the second row.

Example 3. The method of example 2, wherein the creating of the second row creates the second row in an in-memory database.

Example 4. The method of example 2 or example 3, wherein the accessing of the set of creation events comprises accessing a log of creation events during a database recovery.

Example 5. The method of any of examples 1 to 4, wherein the page data structure comprises a set of bits, each bit corresponding to a different row of the page, the set of bits comprising the single bit corresponding to the row.

Example 6. The method of example 5, wherein the set of bits comprises 4096 bits.

Example 7. The method of any of examples 1 to 6, further comprising:

selecting the memory location based on a hash of the page identifier of the first page.

Example 8. The method of example 7, further comprising:
based on a determination that a second hash of a second page identifier of a second page of a database collides with the hash of the page identifier of the first page, adding a second page data structure for the second page to a linked list comprising the page data structure for the first page.

Example 9. The method of example 8, further comprising:
sorting the linked list based on the page identifier of the pages corresponding to the page data structures of the linked list.

Example 10. The method of example 8 or example 9, further comprising:
accessing the second page data structure from a pool of unused page data structures.

Example 11. A system comprising:
a memory that stores instructions; and
one or more processors configured by the instructions to perform operations comprising:
creating a page data structure for a page of a database, the page comprising a row, the page data structure comprising a single bit corresponding to the row, the single bit having a value that indicates that the row was removed from the database;
storing the page data structure at a memory location selected based on a page identifier of the first page;
accessing a creation event comprising an identifier of the row and the page identifier;
accessing, based on the page identifier of the creation event and the identifier of the row, the single bit corresponding to the row; and
based on the single bit corresponding to the row having the value that indicates that the row was removed from the database, refraining from creating the row.

Example 12. The system of example 11, wherein
the creation event is one of a set of creation events and the accessing of the creation event is part of accessing the set of creation events;
the set of creation events further comprise a second creation event comprising a second identifier of a second row and a second page identifier of a second page; and
the operations further comprise:
based on a determination that a memory location identified based on the second page identifier of the creation event does not store data for the second page, creating the second row.

Example 13. The system of example 12, wherein the creating of the second row creates the second row in an in-memory database.

Example 14. The system of any of examples 11 to 13, wherein the page data structure comprises a set of bits, each bit corresponding to a different row of the page, the set of bits comprising the single bit corresponding to the row.

Example 15. The system of example 14, wherein the set of bits comprises 4096 bits.

Example 16. The system of any of examples 11 to 15, wherein the operations further comprise:
selecting the memory location based on a hash of the page identifier of the first page.

Example 17. The system of example 16, wherein the operations further comprise:
based on a determination that a second hash of a second page identifier of a second page of a database collides with the hash of the page identifier of the first page, adding a second page data structure for the second page to a linked list comprising the page data structure for the first page.

Example 18. The system of example 17, wherein the operations further comprise:
sorting the linked list based on the page identifier of the pages corresponding to the page data structures of the linked list.

Example 19. The system of example 17 or example 18, wherein the operations further comprise:
accessing the second page data structure from a pool of unused page data structures.

Example 20. A non-transitory computer-readable medium that stores instructions that, when executed by one or more processors, cause the one or more processors to perform operations comprising:
creating a page data structure for a page of a database, the page comprising a row, the page data structure comprising a single bit corresponding to the row, the single bit having a value that indicates that the row was removed from the database;
storing the page data structure at a memory location selected based on a page identifier of the first page;
accessing a creation event comprising an identifier of the row and the page identifier;
accessing, based on the page identifier of the creation event and the identifier of the row, the single bit corresponding to the row; and
based on the single bit corresponding to the row having the value that indicates that the row was removed from the database, refraining from creating the row.

Figure 7:
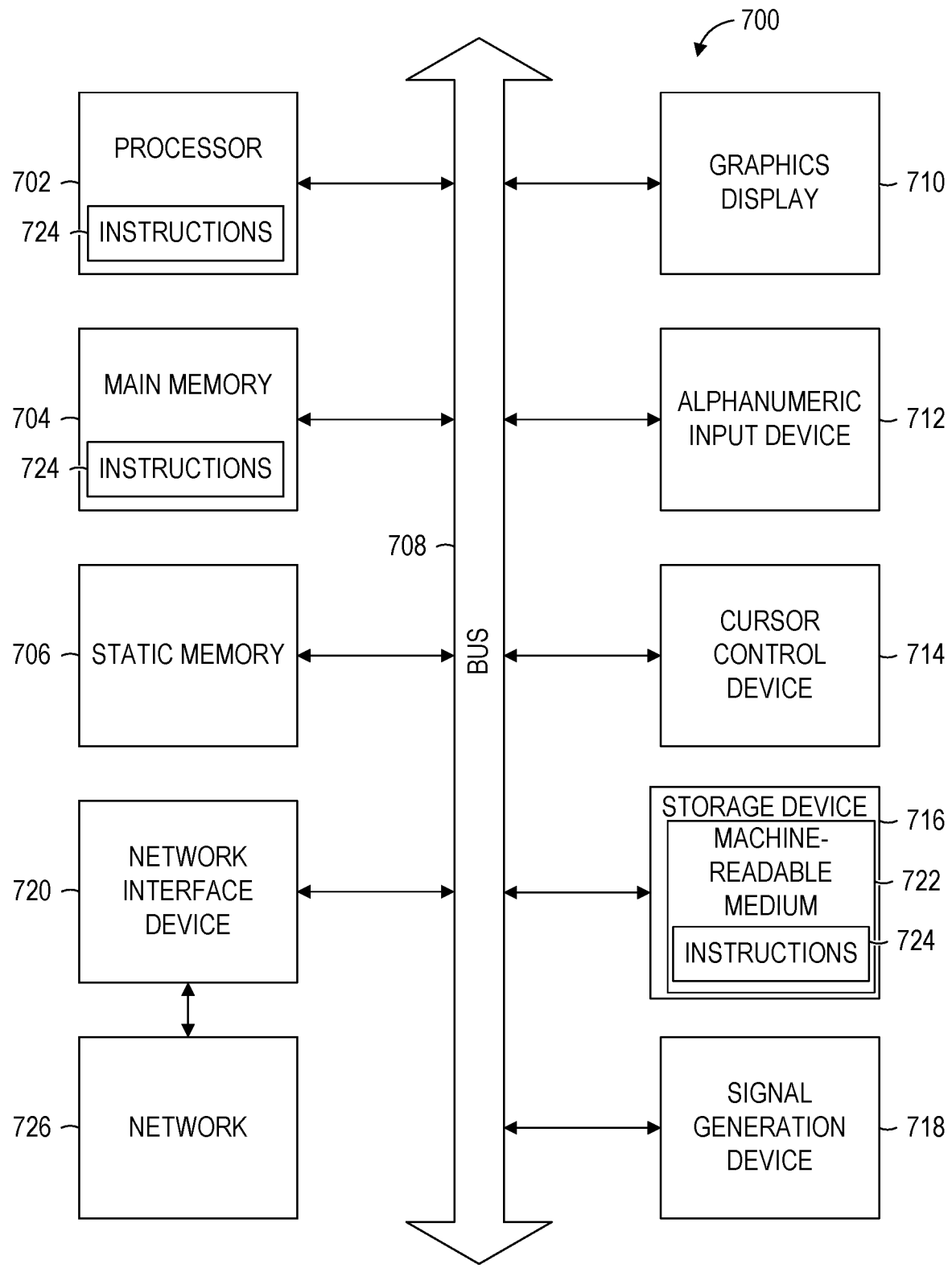
FIG. 7 is a block diagram illustrating components of a machine, according to some example embodiments.

FIG. 7 is a block diagram illustrating components of a machine 700, according to some example embodiments, able to read instructions from a machine-readable medium (e.g., a machine-readable storage medium, a computer-readable storage medium, or any suitable combination thereof) and perform any one or more of the methodologies discussed herein, in whole or in part. Specifically, FIG. 7 shows a diagrammatic representation of the machine 700 in the example form of a computer system within which instructions 724 (e.g., software, a program, an application, an applet, an app, or other executable code) for causing the machine 700 to perform any one or more of the methodologies discussed herein may be executed, in whole or in part. In alternative embodiments, the machine 700 operates as a standalone device or may be connected (e.g., networked) to other machines. In a networked deployment, the machine 700 may operate in the capacity of a server machine or a client machine in a server-client network environment, or as a peer machine in a distributed (e.g., peer-to-peer) network environment. The machine 700 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 724, sequentially or otherwise, that specify actions to be taken by that machine. Further, while only a single machine is illustrated, the term "machine" shall also be taken to include a collection of machines that individually or jointly execute the instructions 724 to perform all or part of any one or more of the methodologies discussed herein.

The machine 700 includes a processor 702 (e.g., a central processing unit (CPU), a graphics processing unit (GPU), a digital signal processor (DSP), an application-specific integrated circuit (ASIC), a radio-frequency integrated circuit (RFIC), or any suitable combination thereof), a main memory 704, and a static memory 706, which are configured to communicate with each other via a bus 708. The machine 700 may further include a graphics display 710 (e.g., a plasma display panel (PDP), a light-emitting diode (LED) display, a liquid crystal display (LCD), a projector, or a cathode ray tube (CRT)). The machine 700 may also include an alphanumeric input device 712 (e.g., a keyboard), a cursor control device 714 (e.g., a mouse, a touchpad, a trackball, a joystick, a motion sensor, or another pointing instrument), a storage device 716, a signal generation device 718 (e.g., a speaker), and a network interface device 720.

The storage device 716 includes a machine-readable medium 722 on which are stored the instructions 724 embodying any one or more of the methodologies or functions described herein. The instructions 724 may also reside, completely or at least partially, within the main memory 704, within the processor 702 (e.g., within the processor's cache memory), or both, during execution thereof by the machine 700. Accordingly, the main memory 704 and the processor 702 may be considered as machine-readable media. The instructions 724 may be transmitted or received over a network 726 via the network interface device 720.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 722 is shown, in an example embodiment, to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions for execution by a machine (e.g., the machine 700), such that the instructions, when executed by one or more processors of the machine (e.g., the processor 702), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instant in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instant of time and to constitute a different hardware module at a different instant of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application programming interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" and "an" are herein used, as is common in patent documents, to include one or more than one instance. Finally, as used herein, the conjunction "or" refers to a non-exclusive "or," unless specifically stated otherwise.

What is claimed is:

1. A method comprising, during a database recovery:
   creating, by one or more processors, a first page data structure for a first page of a database, the first page comprising a row, the first page data structure comprising a single bit corresponding to the row, the single bit having a value that indicates that the row was removed from the database;
   selecting a memory location based on a first hash of a first page identifier of the first page;
   storing the first page data structure at the selected memory location;
   based on a determination that a second hash of a second page identifier of a second page of the database collides with the first hash of the first page identifier of the first page, adding a second page data structure for the second page to a linked list comprising the first page data structure for the first page;
   accessing a log of creation events comprising a creation event comprising an identifier of the row and the first page identifier;
   accessing, based on the first page identifier of the creation event and the identifier of the row, the single bit corresponding to the row; and
   based on the single bit corresponding to the row having the value that indicates that the row was removed from the database, refraining from creating the row.

2. The method of claim 1, wherein the database is an in-memory database.

3. The method of claim 1, wherein the first page data structure comprises a set of bits, each bit corresponding to a different row of the first page, the set of bits comprising the single bit corresponding to the row.

4. The method of claim 3, wherein the set of bits comprises 4096 bits.

5. The method of claim 1, further comprising:
   sorting the linked list based on page identifiers of pages corresponding to page data structures of the linked list.

6. The method of claim 1, further comprising:
   accessing the second page data structure from a pool of unused page data structures.

7. A system comprising:
   a memory that stores instructions; and
   one or more hardware processors configured by the instructions to perform operations comprising, during a database recovery:
   creating a first page data structure for a first page of a database, the first page comprising a row, the first page data structure comprising a single bit corresponding to the row, the single bit having a value that indicates that the row was removed from the database;
   selecting a memory location based on a first hash of a first page identifier of the first page;
   storing the first page data structure at the selected memory location;
   based on a determination that a second hash of a second page identifier of a second page of the database collides with the first hash of the first page identifier of the first page, adding a second page data structure for the second page to a linked list comprising the first page data structure for the first page;

accessing a log of creation events comprising a creation event comprising an identifier of the row and the first page identifier;

accessing, based on the first page identifier of the creation event and the identifier of the row, the single bit corresponding to the row; and based on the single bit corresponding to the row having the value that indicates that the row was removed from the database, refraining from creating the row.

8. The system of claim 7, wherein the database is an in-memory database.

9. The system of claim 7, wherein the first page data structure comprises a set of bits, each bit corresponding to a different row of the first page, the set of bits comprising the single bit corresponding to the row.

10. The system of claim 9, wherein the set of bits comprises 4096 bits.

11. The system of claim 7, wherein the operations further comprise:

sorting the linked list based on page identifiers of pages corresponding to page data structures of the linked list.

12. The system of claim 7, wherein the operations further comprise:

accessing the second page data structure from a pool of unused page data structures.

13. The system of claim 7, wherein the first page data structure identifies a number of deleted rows in the first page.

14. A non-transitory computer-readable medium that stores instructions that, when executed by one or more processors, cause the one or more processors to perform operations comprising, during a database recovery:

creating a first page data structure for a first page of a database, the first page comprising a row, the first page data structure comprising a single bit corresponding to the row, the single bit having a value that indicates that the row was removed from the database;

selecting a memory location based on a first hash of a first page identifier of the first page;

storing the first page data structure at the selected memory location;

based on a determination that a second hash of a second page identifier of a second page of the database collides with the first hash of the first page identifier of the first page, adding a second page data structure for the second page to a linked list comprising the first page data structure for the first page;

accessing a log of creation events comprising a creation event comprising an identifier of the row and the first page identifier;

accessing, based on the first page identifier of the creation event and the identifier of the row, the single bit corresponding to the row; and based on the single bit corresponding to the row having the value that indicates that the row was removed from the database, refraining from creating the row.

15. The non-transitory computer-readable medium of claim 14, wherein the first page data structure comprises a set of bits, each bit corresponding to a different row of the first page, the set of bits comprising the single bit corresponding to the row.

16. The non-transitory computer-readable medium of claim 15, wherein the set of bits comprises 4096 bits.

17. The non-transitory computer-readable medium of claim 14, wherein the database is an in-memory database.

18. The non-transitory computer-readable medium of claim 14, wherein the operations further comprise:

sorting the linked list based on page identifiers of pages corresponding to page data structures of the linked list.

19. The non-transitory computer-readable medium of claim 14, wherein the operations further comprise:

accessing the second page data structure from a pool of unused page data structures.

20. The non-transitory computer-readable medium of claim 14, wherein the first page data structure identifies a number of deleted rows in the first page.

* * * * *